(12) United States Patent
Um et al.

(10) Patent No.: US 12,253,774 B2
(45) Date of Patent: Mar. 18, 2025

(54) DISPLAY PANELS AND METHODS OF DRIVING DISPLAY PANEL

(71) Applicant: TCL CHINA STAR OPTOELECTRONICS TECHNOLOGY CO., LTD., Shenzhen (CN)

(72) Inventors: Yoonsung Um, Shenzhen (CN); Jing Liu, Shenzhen (CN)

(73) Assignee: TCL CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 18/232,553

(22) Filed: Aug. 10, 2023

(65) Prior Publication Data
US 2024/0419042 A1    Dec. 19, 2024

(30) Foreign Application Priority Data
Jun. 13, 2023  (CN) .......................... 202310697190.6

(51) Int. Cl.
*G02F 1/1362*    (2006.01)
*G09G 3/36*    (2006.01)

(52) U.S. Cl.
CPC .. *G02F 1/136218* (2021.01); *G02F 1/136286* (2013.01); *G09G 3/3614* (2013.01); *G09G 3/3688* (2013.01)

(58) Field of Classification Search
None
See application file for complete search history.

(56) References Cited

U.S. PATENT DOCUMENTS

| 2004/0189917 | A1 | 9/2004 | Tanaka et al. |
| 2015/0339991 | A1* | 11/2015 | Jiang ................. G02F 1/134363 345/96 |
| 2017/0243305 | A1* | 8/2017 | Yoo ........................ G06Q 50/06 |

FOREIGN PATENT DOCUMENTS

| CN | 1118448 A | 3/1996 |
| CN | 1648748 A | 8/2005 |
| CN | 101221961 A | 7/2008 |
| CN | 103137616 A | 6/2013 |
| CN | 107479280 A | 12/2017 |
| KR | 20100069902 A | 6/2010 |

OTHER PUBLICATIONS

Chinese Office Action issued in corresponding Chinese Patent Application No. 202310697190.6 dated Jul. 20, 2023, pp. 1-7, 17pp.

* cited by examiner

*Primary Examiner* — Phu Vu
(74) *Attorney, Agent, or Firm* — The Roy Gross Law Firm, LLC; Roy Gross

(57) ABSTRACT

A display panel comprising a plurality of sub-pixels, wherein the display panel comprises: a first substrate; a data wire disposed on the first substrate; one or more shield electrodes disposed on a side of the data wire away from the first substrate; a plurality of pixel electrodes disposed on a side of the shield electrodes away from the data wire, wherein the plurality of pixel electrodes are disposed corresponding to the plurality of sub-pixels, respectively, and wherein in each of the sub-pixels, the shield electrode comprises a first electrode and a second electrode that are independent of each other.

17 Claims, 6 Drawing Sheets

DISPLAY PANELS AND METHODS OF DRIVING DISPLAY PANEL

CROSS-REFERENCE TO RELATED APPLICATIONS

This application claims priority to Chinese Patent Application No. 202310697190.6, filed with the China National Intellectual Property Administration on Jun. 13, 2023, the entire content of which is incorporated by reference herein.

TECHNICAL FIELD

The present application relates to display technologies, and more particularly, to display panels and methods of driving the display panel.

BACKGROUND

Liquid crystal display panels (TFT-LCDs) have been widely used in people's lives, for example, screens for mobile phones, computers and televisions. A black matrix (BM) disposed on a side of a color filter substrate is required in a current liquid crystal display panel to block light. When the array substrate and/or the color filter substrate are shifted, the position of the BM is shifted, which causes light leakage and color shift. To this end, a design of reducing BMs on a data wire (Data BM less, DBS) may be used. That is, a DBS electrode in the same layer as a pixel electrode is disposed above a data wire of the array substrate, and there is no voltage difference between the DBS electrode and a color filter (CF) common electrode of the color filter substrate, so that liquid crystal between the DBS electrode and the CF common electrode is not oriented and is in a black state. Therefore, it may replace the black matrix to block light.

However, a width of the DBS electrode is larger than that of the data wire, and it is necessary to maintain a certain distance between the DBS electrode and the pixel electrode, so that a space for the pixel electrode is reduced, thereby reducing an aperture ratio of the pixel.

SUMMARY

An embodiment of the present application provides a display panel and a method of driving the display panel to solve a problem that the space for the pixel electrode is reduced and the aperture ratio of the pixel is reduced due to the existing DBS electrode.

An embodiment of the present application provides a display panel including a plurality of sub-pixels, the display panel including: a first substrate; a data wire disposed on the first substrate; one or more shield electrodes disposed on a side of the data wire away from the first substrate; a plurality of pixel electrodes disposed on a side of the shield electrodes away from the data wire, wherein the plurality of pixel electrodes are disposed corresponding to the plurality of sub-pixels, respectively, and wherein in each of the sub-pixels, the shield electrode comprises a first electrode and a second electrode that are independent of each other.

Alternatively, the first electrode in each of the sub-pixels is electrically connected the first electrode in another of the sub-pixels, and the second electrode in each of the sub-pixels is electrically connected the second electrode in another of the sub-pixels.

Alternatively, the display panel further comprises: a first sub-T-side common electrode disposed on the first substrate, wherein the first electrode in each of the sub-pixels is electrically connected to the first sub-T-side common electrode; a second sub-T-side common electrode disposed on the first substrate, wherein the second electrode in each of the sub-pixels is electrically connected to the second sub-T-side common electrode.

Alternatively, within one sub-pixel of the sub-pixels, the difference between an area of the first electrode and an area of the second electrode is less than or equal to 10% of the area of the first electrode.

Alternatively, within one of the sub-pixels, the area of the first electrode is equal to the area of the second electrode.

Alternatively, a shape of the first electrode is engaged with that of the second electrode in each of the sub-pixels.

Alternatively, the first electrode comprises two first sub-electrodes, the two first sub-electrodes are symmetrically arranged at both sides of the second electrode, and each of the first electrode and the second electrode has a centrosymmetric pattern; or the first electrode comprises a first stem electrode and at least one first branch electrode, the second electrode comprises a second stem electrode and at least one second branch electrode, the first stem electrode and the second stem electrode are arranged facing with each other, at least a portion of the first branch electrode and at least a portion of the second branch electrode are staggered, and a shape of the first branch electrode is engaged with that of the second branch electrode; or after the first electrode is rotated by 180 degrees, the first electrode has the same shape and same orientation as the second electrode, the first electrode comprises a first sub-portion extending in a first direction and a second sub-portion connected to the first sub-portion, the second electrode comprises a third sub-portion extending in the first direction and a fourth sub-portion connected to the third sub-portion, each of the second sub-portion and the fourth sub-portion is located between the first sub-portion and the third sub-portion, and each of the second sub-portion and the fourth sub-portion at least have one of a triangular shape, a circular shape, a trapezoidal shape, and a rectangular shape.

An aspect of the present application provides a method of driving a display panel, comprising: providing a display panel, wherein the display panel comprises a plurality of sub-pixels, the display panel comprises a first substrate, a data wire, one or more shield electrodes, and a plurality of pixel electrodes, the data wire is disposed on the first substrate, the shield electrodes are disposed on a side of the data wire away from the first substrate, the plurality of pixel electrodes are disposed on at side of the shield electrode away from the data wire, the plurality of pixel electrodes are disposed corresponding to the plurality of sub-pixels, and in each of the sub-pixels, the shield electrode comprises a first electrode and a second electrode that are independent of each other; and providing an electrical signal to the display panel, wherein voltage of the first electrode is different from voltage of the second electrode.

Alternatively, the difference in the voltages of the first electrode and the second electrode comprises that the voltages of the first electrode and the second electrode have opposite polarities; alternatively, the display panel further comprises a second substrate opposite to the first substrate, and a common electrode disposed on the second substrate, wherein the data wire, the shield electrode, the common electrode, and a plurality of the pixel electrodes are all located between the first substrate and the second substrate, and the polarity of the voltage of the first electrode relative to the common electrode is opposite to the polarity of the voltage of the second electrode relative to the common electrode.

Alternatively, a first absolute value of a voltage difference between the voltages of the first electrode and the common electrode and a second absolute value of a voltage difference between the voltage of the second electrode and the common electrode are both less than 10 V.

Alternatively, a voltage of the common electrode has a fixed value, and the voltages of the first electrode and the voltage of the second electrode are varied.

Alternatively, the polarity of the first electrode and the polarity of the second electrode are unchanged during each frame of picture.

Alternatively, a voltage of the common electrode is a first sub-common voltage in a first frame of any two adjacent frame and is a second sub-common voltage in another frame of the any two adjacent frame adjacent with the first frame, and each of the voltage of the first electrode and the voltage of the second electrode is switched between two fixed values.

Alternatively, the difference in the voltages of the first electrode and the second electrode comprises that: in the two adjacent frames, the polarity of the first electrode is reversed, and the polarity of the second electrode is reversed.

The present application provides a display panel and a driving method thereof.

DRAWING ILLUSTRATION

In order that technical solutions in embodiments of the present application may be illustrated more clearly, reference will now be made briefly to the accompanying drawings required for the description of the embodiments. It will be apparent that the accompanying drawings in the following description are merely some of the embodiments of the present application, and other drawings may be made to those skilled in the art without involving any inventive effort.

DETAILED DESCRIPTIONS

Figure 1:
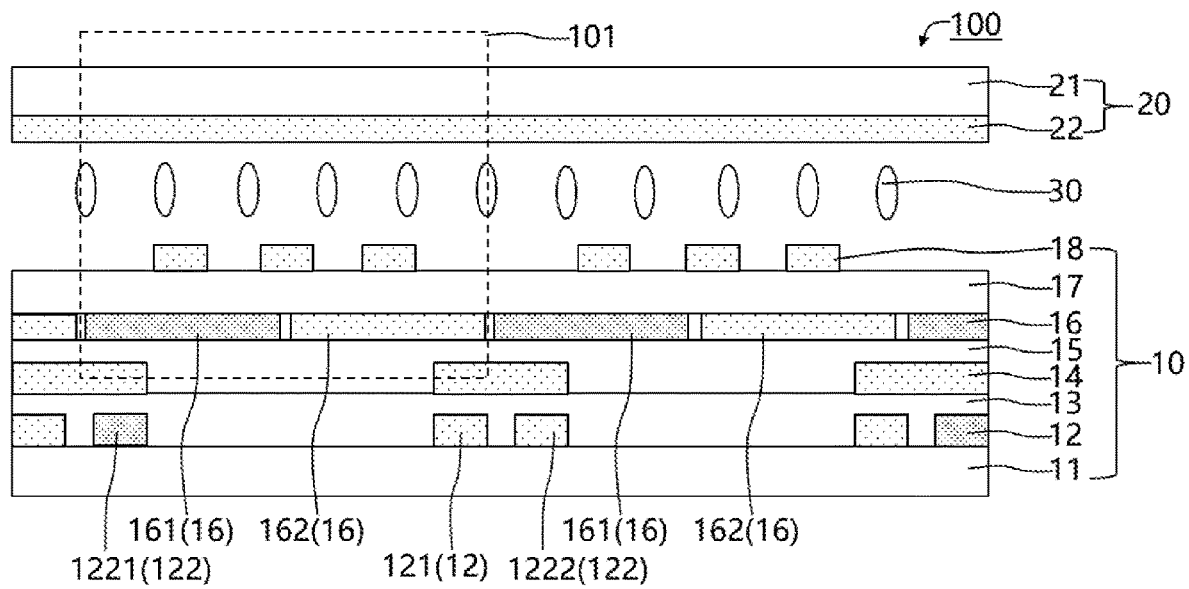
FIG. 1 is a partial cross-sectional view of a display panel according to an embodiment of the present application.

Technical solutions in embodiments of the present application will be clearly and completely described below in connection with the accompanying drawings in the embodiments of the present application. It will be apparent that the described embodiments are merely a part of the embodiments of the present application, rather than all the embodiments. Based on the embodiments in the present application, all other embodiments obtained by a person skilled in the art without involving any inventive effort are within the scope of the present application. Furthermore, it is to be understood that the detailed embodiments described herein are for purposes of illustration and explanation only and are not intended to limit the present application. In the present application, unless otherwise stated, directional words used such as "upper" and "lower" generally refer to the upper and lower directions of the device in actual use or working state, and specifically refer to the drawing directions in the drawings; and "inner" and "outer" refer to the outline of the device.

An embodiment of the present application provides a display panel including a plurality of sub-pixels. The display panel includes a substrate; a data wire disposed on the substrate; a shield electrode disposed on a side of the data wire away from the substrate; a plurality of pixel electrodes provided on a side of the shield electrode away from the data wire. The plurality of pixel electrodes are provided corresponding to the plurality of sub-pixels. A shield electrode corresponding to a sub-pixel includes a first electrode and a second electrode that are independent of each other.

The present application further provides a method of driving the display panel, which is described in detail below. It should be noted that the order in which the following embodiments are described is not intended to limit a preferred order of the embodiments.

Embodiment 1

Figure 2:
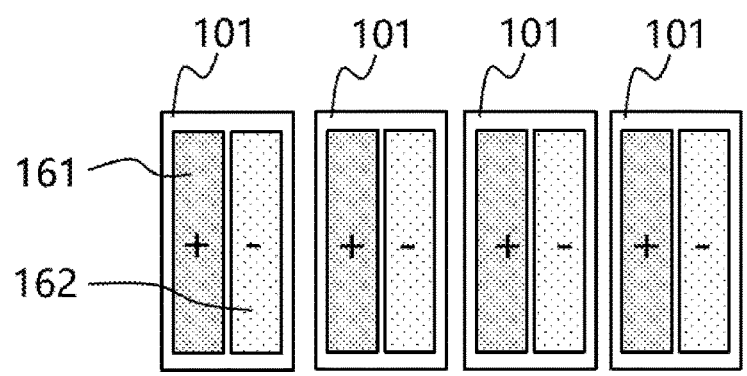
FIG. 2 is a polarity diagram of a shield electrode of a frame of picture according to an embodiment of the present application.
Figure 3:
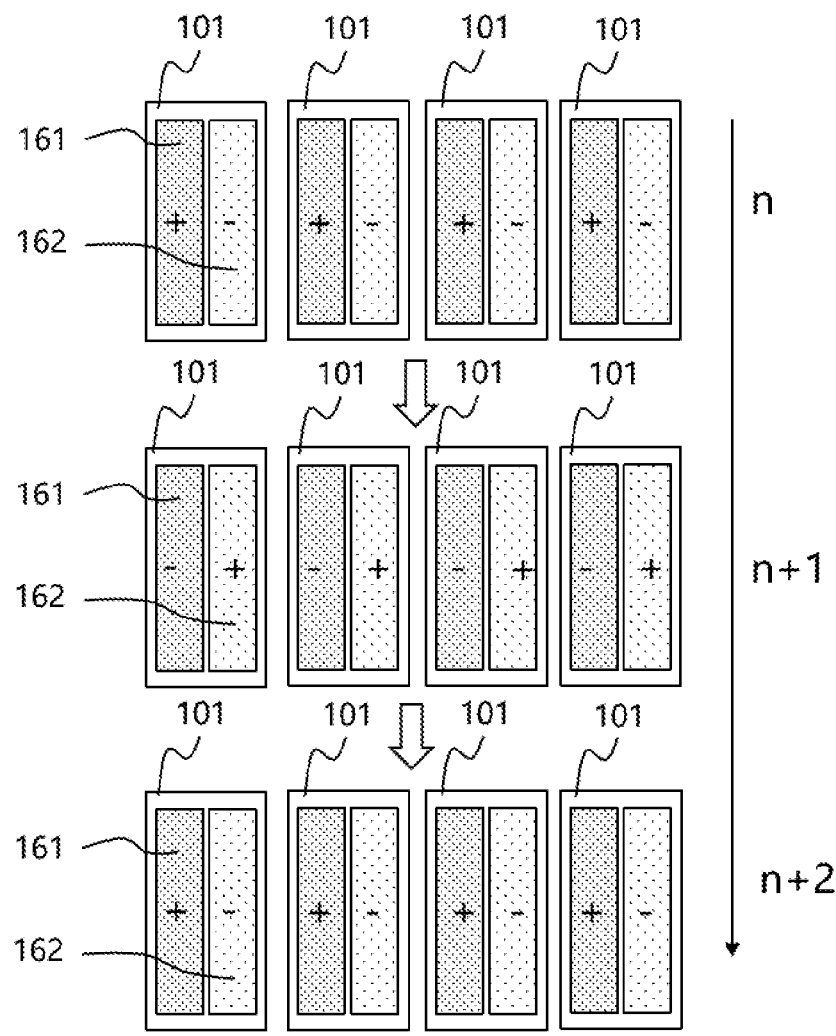
FIG. 3 is a diagram of polarity of a shield electrode at a plurality of picture frames according to an embodiment of the present application.
Figure 4:
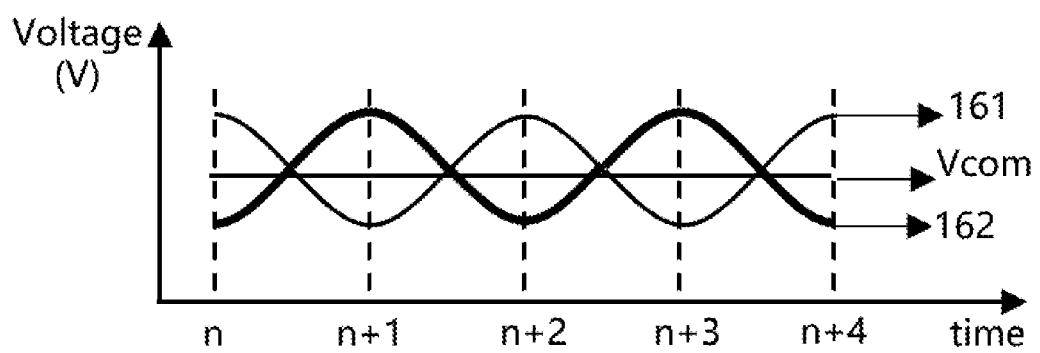
FIG. 4 is a diagram of a first signal supply method for a first electrode and a second electrode according to an embodiment of the present application.
Figure 5:
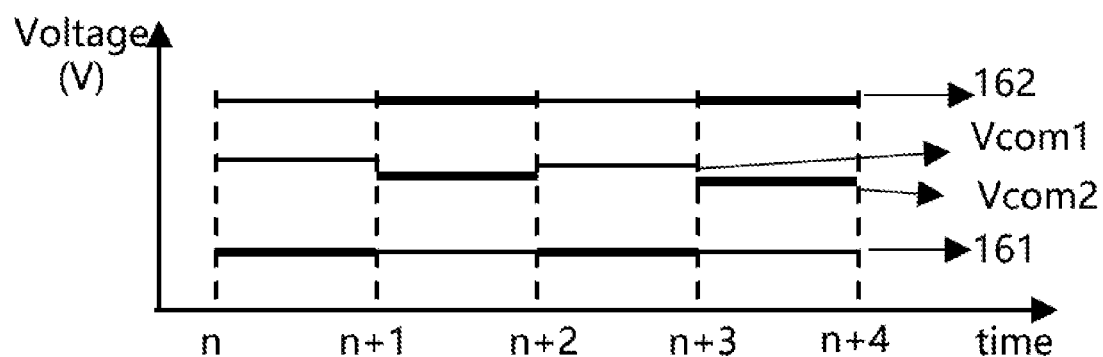
FIG. 5 is a diagram of a second signal supply mode for the first electrode and the second electrode according to an embodiment of the present application.

FIG. 1 is a cross-sectional schematic view of a portion of a display panel according to an embodiment of the present application. FIG. 2 is a schematic view of polarity of a shield electrode for a picture at a frame according to an embodiment of the present application. FIG. 3 is a schematic view of polarity of shield electrodes for pictures at frames according to an embodiment of the present application. FIG. 4 is a diagram of a first signal supply method for a first electrode and a second electrode according to an embodiment of the present application. FIG. 5 is a diagram of a second signal supply mode for the first electrode and the second electrode according to an embodiment of the present application.

An embodiment of the present application provides a display panel 100 including a plurality of sub-pixels 101. The display panel 100 includes a substrate 11, a data wire 14, a shield electrode 16, and a plurality of pixel electrodes 18. The data wire 14 is provided on the substrate 11. The shield electrode 16 is provided on a side of the data wire 14 away from the substrate 11. The plurality of pixel electrodes 18 are provided on one side of the shield electrode 16 away from the data wire 14. Each of the plurality of sub-pixels 101 is provided corresponding to more than one of the plurality of pixel electrodes 18. The shield electrode 16 corresponding to each of the sub-pixel 101 includes a first electrode 161 and a second electrode 162 that are independent of each other.

In an embodiment, a display panel includes a plurality of sub-pixels 101. The display panel 100 includes a substrate 11, a data wire 14, a shield electrode 16, and a plurality of pixel electrodes 18. The data wire 14 is provided on the substrate 11. The shield electrode 16 is provided on the data wire 14. The plurality of pixel electrodes 18 are provided on the shield electrode 16. Each of the plurality of sub-pixels 101 is provided corresponding to more than one of the plurality of pixel electrodes 18. The shield electrode 16 corresponding to each of the sub-pixel 101 includes a first electrode 161 and a second electrode 162.

Alternatively, in some embodiments, the voltage transmitted through the first electrode 161 is different from that of the second electrode 162.

In an embodiment, the display panel 100 may be a liquid crystal display panel, and the display panel 100 may include a substrate 11 and a substrate 21. The substrate 11 may be a carrier substrate of an array substrate, and the substrate 21 may be a carrier substrate of a color filter substrate.

In the present embodiment, by providing a shield electrode 16 between the pixel electrode 18 and the data wire 14, the shield electrode 16 is configured to shield the influence of the voltage transmitted through the data wire 14 on the liquid crystal molecules. In addition, the shield electrode 16 is configured to avoid light leakage and color shift of the display panel when the position of the black matrix (BM) is shifted. Further, compared with the arrangement of the black matrix on data lines (DBS) electrode, a distance between the pixel electrode 18 and the data wire 14 may be reduced, thereby increasing an area of a region for arranging the pixel electrode 18, thereby increasing an aperture ratio of the sub-pixel 101. In addition, it has further found that when the shield electrode 16 is provided as a whole to cover an entire upper surface of the substrate, an electric field having a component in a horizontal direction is easily generated between the plurality of branch electrodes of the pixel electrode 18 and the shield electrode 16, so that the voltage-transmittance curve of the display panel is relatively sensitive, thereby causing problems of low-gray-scale mura and color shift. The present application further provides another solution in which the shield electrode 16 corresponding to one of the sub-pixels 101 includes the first electrode 161 and the second electrode 162. The voltages of the first electrode 161 and the second electrode 162 may be independent from each other and different. Due to the difference in voltages of the first electrode 161 and the second electrode 162, one sub-pixel 101 are divided into a primary sub-pixel and a secondary sub-pixel, thereby achieving an effect of doubling the number of sub-pixel domains (for example, a 4-domain sub-pixel is converted to an 8-domain sub-pixel). The brightness of the one sub-pixel 101 is the average brightness of the primary sub-pixel and the secondary sub-pixel (for example, the primary sub-pixel is a region of the one sub-pixel 101 corresponding to the first electrode, and the secondary sub-sub-pixel is a region of the one sub-pixel 101 corresponding to the second electrode), so that the brightness and the color shift of one sub-pixel 101 are less sensitive to voltage, thereby avoiding a more sensitive voltage-transmittance curve, thereby avoiding the problem of the low-grayscale mura and the color shift.

Alternatively, in some embodiments, the voltages of the first electrode 161 and the second electrode 162 have opposite polarities. Alternatively, the polarity of the first electrode 161 relative to the common electrode 22 is opposite to the polarity of the second electrode 162 relative to the common electrode 22.

In an embodiment, the voltages of the first electrode 161 and the second electrode 162 have opposite polarities, so that a primary sub-pixel and a secondary sub-pixel are divided in one sub-pixel 101, thereby achieving an effect of doubling the number of sub-pixel domains (for example, a four-domains sub-pixel is converted to an eight-domains sub-pixel).

Note that the voltage polarity of the first electrode 161 and the voltage polarity of the second electrode 162 are opposite, and one of the voltages of the first electrode 161 and the second electrode 162 is a positive voltage, and the other is a negative voltage. For example, the voltage of the first electrode 161 is +3V, and the voltage of the second electrode 162 is −3V.

It should be noted that the voltage polarity of the first electrode 161 and the voltage polarity of the second electrode 162 are opposite, i.e., the polarities of the voltages of the first electrode 161 and the second electrode 162 relative to the voltage of the common electrode may be opposite. For example, the voltage of the first electrode 161 is larger than the voltage of the common electrode, and the voltage of the second electrode 162 is lesser than the voltage of the common electrode.

In an embodiment, when the display panel 100 is a liquid crystal display panel, the display panel 100 includes a substrate 11 and a substrate 21 oppositely disposed, and a liquid crystal layer 30 between the substrate 11 and the substrate 21. The display panel 100 includes a plurality of sub-pixels 101. The display panel 100 includes a data wire 14, a shield electrode 16, a plurality of pixel electrodes 18, and a common electrode 22 disposed between the substrate 11 and the substrate 21. The data wire 14 is disposed on the substrate 11. The shield electrode 16 is disposed on the data wire 14 and on the substrate 11. The plurality of pixel electrodes 18 are disposed on the shield electrode 16 and on the substrate 11, and the plurality of pixel electrodes 18 are provided respectively corresponding to the plurality of sub-pixels 101. The shield electrode 16 corresponding to one of the sub-pixels 101 includes a first electrode 161 and a second electrode 162. Voltages of the first electrode 161 and the second electrode 162 have opposite polarities relative to the voltage of the common electrode 22.

In an embodiment, the substrate 11 may be a glass or a flexible substrate, which is not limited herein.

In an embodiment, the display panel 100 may be a vertical alignment type liquid crystal display panel (VA mode TFT-LCD), but is not limited thereto.

Figure 6:
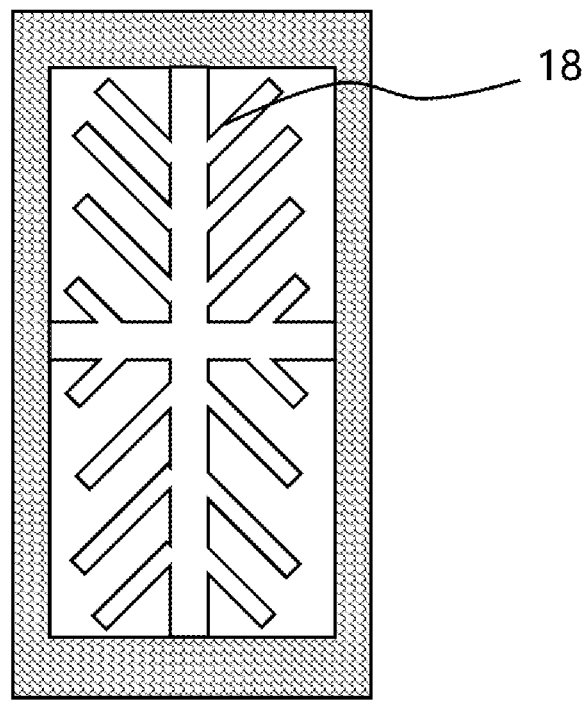
FIG. 6 is a schematic view of a pixel electrode of a display panel according to an embodiment of the present application.

In an embodiment, the display panel 100 includes a plurality of sub-pixels 101 arranged in an array. It will be readily appreciated that each of sub-pixel includes one pixel electrode 18, and the pixel electrode 18 may include a stem electrode and at least one branch electrode (as shown in FIG. 6). For example, in a vertically aligned liquid crystal display panel having four 1domains, the pixel electrode may be in a shape of "*", such as, but not limited to;

In an embodiment, the substrate 11 and the plurality of film layers on the substrate 11 may be referred to as an array substrate or a lower substrate, the substrate 21 and the plurality of film layers on the substrate 21 may be referred to as a color filter substrate or an upper substrate, and the display panel 100 may also be a COA-type (color filter on array) liquid crystal display panel, that is, the color filter layer may be disposed on the array substrate or the lower substrate.

In an embodiment, the display panel 100 includes a common electrode 22 disposed between the substrate 11 and the substrate 21. In the vertically aligned liquid crystal display panel, the display panel 100 includes a liquid crystal layer 30 disposed between the substrate 11 and the substrate 21, the common electrode 22 is disposed on the substrate 21, and the data wire 14, the shield electrode 16, and the plurality of pixel electrodes 18 are disposed on the substrate 11. The display panel may further include a T-side common electrode 122 disposed on the substrate 11.

In an embodiment, only a portion of film layers of the display panel 100 is illustrated in FIG. 1. The display panel 100 may further include a plurality of thin film transistors, a driving circuit, or the like (not shown in FIG. 1). The layers of the display panel 100 shown in FIG. 1 includes, a substrate 11, a scan wire 121 and a T-side common electrode 122 disposed on the substrate 11 in the same layer, a first insulating layer 13 disposed on the scan wire 121 and the T-side common electrode 122, a data wire 14 disposed on the first insulating layer 13, a second insulating layer 15 disposed on the data wire 14, a third insulating layer 17 disposed on the second insulating layer 15, a pixel electrode 18 disposed on the third insulating layer 17, a liquid crystal layer 30 disposed on the pixel electrode 18, a common electrode 22 disposed on the liquid crystal layer 30, and a substrate 21 in sequence. FIG. 1 shows that the scan wire 121 and the T-side common electrode 122 are formed by patterning the first metal layer 12. In other embodiments, the scan wire 121 and the T-side common electrode 122 may be provided in other manners.

In an embodiment, the shield electrode 16 corresponding to one of the sub-pixels 101 includes a first electrode 161 and a second electrode 162, that is, in one sub-pixel 101, the shield electrode 16 is divided into a first electrode 161 and a second electrode 162. The first electrode 161 and the second electrode 162 are spaced apart from each other and electrically insulated.

In an embodiment, the voltages of the first electrode 161 and the second electrode 162 relative to the voltage of the common electrode 22 have opposite polarities, that is, the voltage of one of the first electrode 161 and the second electrode 162 is larger than the voltage of the common electrode 22, and the voltage of the other of the first electrode 161 and the second electrode 162 is lesser than the voltage of the common electrode 22.

In an embodiment, FIG. 1 shows that the T-side common electrode 122 includes a first sub-T-side common electrode 1221 and a second sub-T-side common electrode 1222. An electrical signal may be input to the first electrode 161 through the first sub-T-side common electrode 1221, and an electrical signal may be input to the second electrode 162 through the second sub-T-side common electrode 1222.

In an embodiment, the common electrode 22 on the substrate 21 and the first sub-T-side common electrode 1221 and the second sub-T-side common electrode 1222 are separately supplied with electrical signals from the driving chip through different traces, respectively.

In an embodiment, referring to FIG. 2, in one sub-pixel 101, the voltage of the first electrode 161 is larger than the voltage of the common electrode 22, and the first electrode 161 is of a positive polarity. The voltage of the second electrode 162 is lesser than the voltage of the common electrode 22, and the second electrode 162 is of a negative polarity.

In the present embodiment, by providing a shield electrode 16 between the pixel electrode 18 and the data wire 14, the shield electrode 16 shields the influence of the voltage through the data wire 14 on the liquid crystal molecules. Compared with the DBS electrode, the shield electrode 16 are provided in a layer different from layers in which the data wire and the pixel electrode 18 are disposed, so that the space for disposing the DBS electrode is not required. The distance between the pixel electrode 18 and the data wire 14 may be reduced, thereby increasing the area of the region for disposing the pixel electrode 18, thereby increasing an aperture ratio of the sub-pixel 101. In addition, it has further found that when the shield electrode 16 is provided as a whole to cover an entire upper surface of the substrate, an electric field having a component in a horizontal direction is easily generated between the plurality of branch electrodes of the pixel electrode 18 and the shield electrode 16, so that the voltage-transmittance curve of the display panel is relatively sensitive, thereby causing problems of low-grayscale mura and color shift. The present application further provides another solution in which the shield electrode 16 corresponding to one of the sub-pixels 101 includes the first electrode 161 and the second electrode 162. The voltages of the first electrode 161 and the second electrode 162 may be independent from each other and different. Due to the difference in voltages of the first electrode 161 and the second electrode 162, one sub-pixel 101 are divided into a primary sub-pixel and a secondary sub-pixel, thereby achieving an effect of doubling the number of sub-pixel domains (for example, a 4-domain sub-pixel is converted to an 8-domain sub-pixel). The brightness of the one sub-pixel 101 is the average brightness of the primary sub-pixel and the secondary sub-pixel (for example, the primary sub-pixel is a region of the one sub-pixel 101 corresponding to the first electrode, and the secondary sub-sub-pixel is a region of the one sub-pixel 101 corresponding to the second electrode), so that the brightness and the color shift of one sub-pixel 101 are less sensitive to voltage, thereby avoiding a more sensitive voltage-transmittance curve, thereby avoiding the problem of the low-grayscale mura and the color shift.

Further, the first absolute value of the voltage difference between voltages of the first electrode 161 and the common electrode 22 and the second absolute value of the voltage difference between voltages of the second electrode 162 and the common electrode 22 are both less than 10 V.

In an embodiment, the first absolute value of the voltage difference between the first electrode 161 and the common electrode 22, and the second absolute value of the voltage difference between the second electrode 162 and the common electrode 22 are both less than 10 V, so that it is possible to avoid too large a difference between the first and second absolute values, and the phenomenon that the liquid crystal molecules are polarized by an excessive bias voltage may be avoided.

In some embodiments, referring to FIG. 3, in two adjacent frames, the polarity of the first electrode 161 is reversed and the polarity of the second electrode 162 is reversed.

In an embodiment, FIG. 3 shows an n-th frame picture, an (n+1)-th frame picture, and an (n+2)-th frame picture, where n is a positive integer. The n-th frame picture and the (n+1)-th frame picture are two adjacent frames, the first electrode 161 is switched from a positive polarity in the n-th frame picture to a negative polarity in the (n+1)-th frame picture, and the second electrode 162 is switched from a negative polarity in the n-th frame picture to a positive polarity in the (n+1)-th frame picture. The (n+1)-th frame picture and the (n+2)-th frame picture are two adjacent frames, the first electrode 161 is switched from the negative polarity in the (n+1)-th frame picture to the positive polarity in the (n+2)-th frame picture, and the second electrode 162 is switched from the positive polarity in the (n+1)-th frame picture to the negative polarity in the (n+2)-th frame picture.

In an embodiment, in two adjacent frames of pictures, the polarity of the first electrode 161 is reversed, and the polarity of the second electrode 162 is reversed, so that a bias voltage in a constant direction may be prevented from being generated by the display panel, and an electric field generated by the first electrode 161 in a frame may have a horizontal component in opposite direction with that of the first electrode 161 in another frame adjacent with the frame and thus this two horizontal components may be offset, which seems that no horizontal electric field component is generated during the display period, thereby avoiding that the voltage-to-transmittance curve is relatively sensitive, thereby avoiding the problem of the low-grayscale mura and the color shift. Similarly, the second electrode 162 has the same effect, and details are not described herein.

Referring to FIGS. 3 and 4, a mode of supplying signals to the first electrode 161 and the second electrode 162 according to an embodiment is illustrated.

Alternatively, in some implementations, in the two adjacent frames, the voltage Vcom of the common electrode has a fixed value, and the voltages of the first electrode 161 and the voltage of the second electrode 162 are varied.

In an embodiment, FIG. 4 shows that in any one frame of picture, the voltage Vcom of the common electrode has a fixed value, and the first electrode 161 and the second electrode 162 both have changed values. The polarity of the first electrode 161 and the polarity of the second electrode 162 during one frame of picture are unchanged, but the difference between the voltage of the first electrode 161 and the voltage Vcom of the common electrode varies, and the difference between the voltage of the second electrode 162 and the voltage Vcom of the common electrode varies. FIG. 4 shows that the voltages of the first electrode 161 and the second electrode 162 have sinusoidal or cosine waveforms.

In an embodiment, in the two adjacent frames, the voltage Vcom of the common electrode has a fixed value, and the voltages of the first electrode 161 and the voltage of the second electrode 162 are varied. Compared with the related art, a shield electrode 16 is further provided in the present application. In the related art, the liquid crystal molecules are oriented due to the potential difference between the pixel electrode and the common electrode. In the present application, due to the shield electrode 16, the orientation of the liquid crystal molecules is affected not only by the vertical electric field between the pixel electrode and the common electrode, but also by the horizontal electric field between the shielding electrode 16 and the pixel electrode 18. Therefore, in the present application, the fluctuation of the shield electrode 16 in the mass production process is more likely to affect the fluctuation of the orientation of the liquid crystal molecules, thereby increasing the sensitivity of the deflection of the liquid crystal molecules, thereby causing problems such as low gray scale color difference and mura. The influence of the shield electrode 16 may be negated, reducing the sensitivity, so that the display panel has less color shift and mura.

Referring to FIGS. 3 and 5, a mode of supplying signals to the first electrode 161 and the second electrode 162 according to another embodiment is illustrated.

Alternatively, in some implementations, the voltage Vcom of the common electrode is a first sub-common voltage Vcom1 in a first frame of any two adjacent frame of pictures and a second sub-common voltage Vcom2 in another frame of the any two adjacent frame of pictures adjacent with the first frame, and each of the voltage of the first electrode 161 and the voltage of the second electrode 162 is switched between two fixed values.

In an embodiment, the voltage Vcom of the common electrode is a first sub-common voltage Vcom1 and a second sub-common voltage Vcom2 in adjacent two frames of pictures, respectively, and each of the voltage of the first electrode 161 and the voltage of the second electrode 162 is switched between two fixed values. Therefore, the sensitivity of the common electrode to the the orientation of the liquid crystal molecules is reduced, thereby avoiding the risk of problems such as mura and color skew.

It should be noted that the thicker lines in FIGS. 4 and 5 represent the electrical signals of the second electrode 162, and the thinner lines represent the electrical signals of the first electrode 161.

In some embodiments, the plurality of first electrodes 161 corresponding to the plurality of sub-pixels 101 are electrically connected with each other, and the plurality of second electrodes 162 corresponding to the plurality of sub-pixels 101 are electrically connected with each other.

In an embodiment, the plurality of first electrodes 161 corresponding to the plurality of sub-pixels 101 are connected to each other, or are electrically connected with each other through the first sub-T-side common electrode 1221, and the plurality of second electrodes 162 corresponding to the plurality of sub-pixels 101 are connected to each other, or are electrically connected with each other through the second sub-T-side common electrode 1222, so that the number of input terminals of a pad portion may be reduced, thereby facilitating the realization of a narrow frame.

In some embodiments, within one sub-pixel 101, the difference between the area of the first electrode 161 and the area of the second electrode 162 is less than or equal to 10% of the area of the first electrode.

In an embodiment, within one sub-pixel 101, the difference between the area of the first electrode 161 and the area of the second electrode 162 is less than or equal to 10%, and an electric field generated by the first electrode 161 in a frame may have a horizontal component in opposite direction with that of the second electrode 162 in the same frame, so that the voltage-to-transmittance curve is avoided to be more sensitive, thereby avoiding generation of low-grayscale mura and color shift.

In some embodiments, within one sub-pixel 101, the area of the first electrode 161 is equal to the area of the second electrode 162.

In an embodiment, within one sub-pixel 101, the area of the first electrode 161 is equal to the area of the second electrode 162, so that the horizontal component of the electric field formed by the first electrode 161 is in opposite direction with the horizontal component of the electric field formed by the second electrode 162, and thus they may be offset.

Embodiment 2

This embodiment is the same as or similar to the display panel 100 in any one of the above embodiments, except that the shapes of the first electrode 161 and the second electrode 162 in the display panel 100 are further described.

Figure 7:
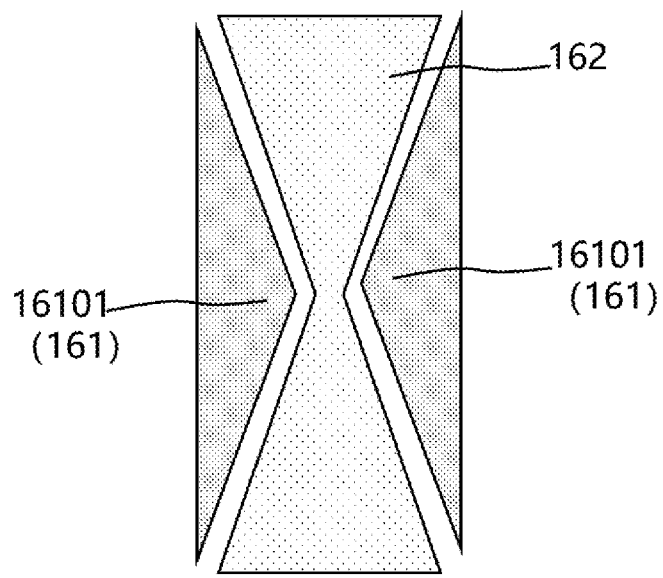
FIG. 7 is a schematic view of shapes of a first electrode and a second electrode according to an embodiment of the present application.
Figure 8:
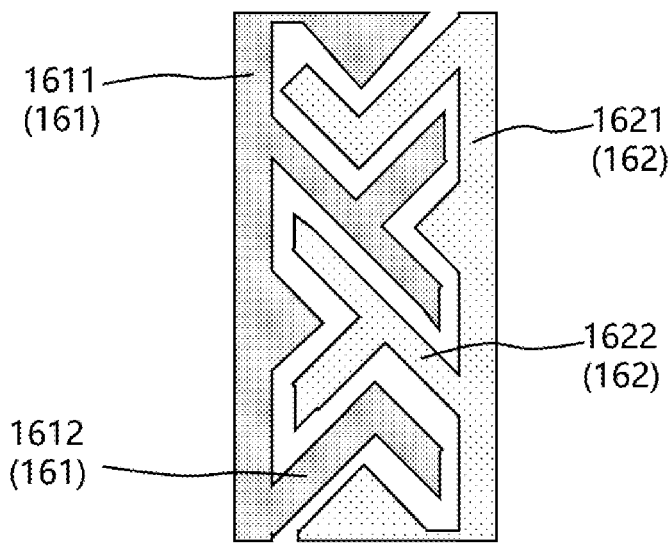
FIG. 8 is a schematic view of shapes of a first electrode and a second electrode according to an embodiment of the present application.
Figure 9:
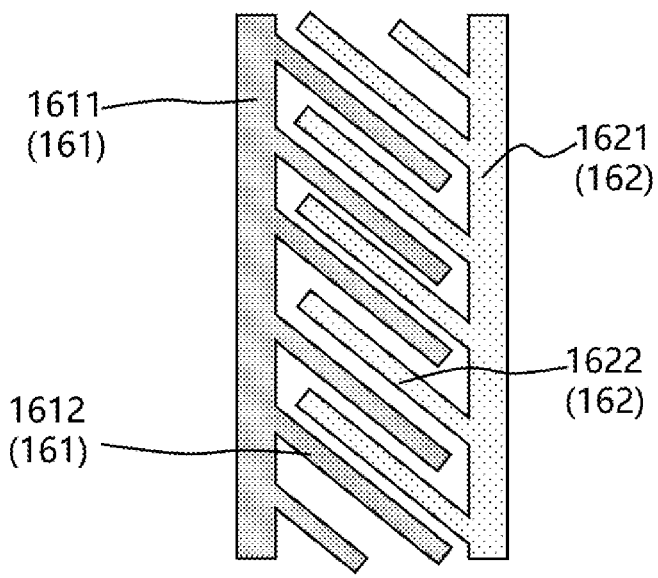
FIG. 9 is a schematic view of shapes of a first electrode and a second electrode according to an embodiment of the present application.
Figure 10:
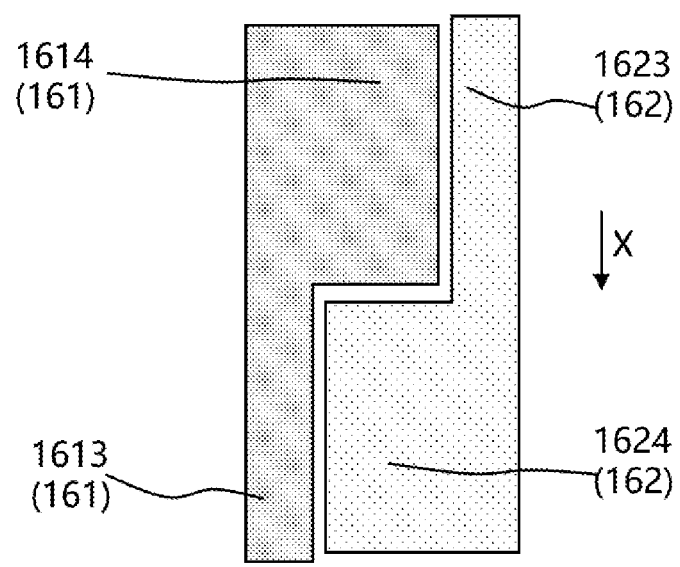
FIG. 10 is a schematic view of shapes of a first electrode and a second electrode according to an embodiment of the present application.
Figure 11:
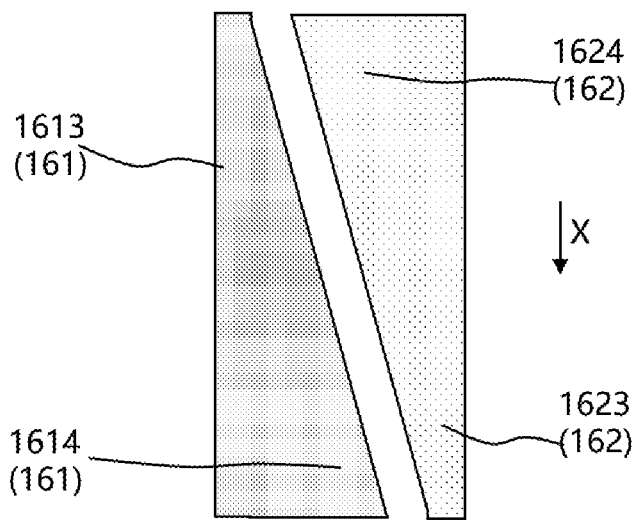
FIG. 11 is a schematic view of shapes of a first electrode and a second electrode according to an embodiment of the present application.

FIG. 6 is a schematic view of a pixel electrode of a display panel according to another embodiment of the present application. FIG. 7 is a schematic view of shapes of a first electrode and a second electrode according to another embodiment of the present application. FIG. 8 is a schematic view of shapes of a first electrode and a second electrode according to another embodiment of the present application. FIG. 9 is a schematic view of shapes of a first electrode and a second electrode according to another embodiment of the present application. FIG. 10 is a schematic view of shapes of a first electrode and a second electrode according to another embodiment of the present application. FIG. 11 is a schematic view of shapes of a first electrode and a second electrode according to another embodiment of the present application.

FIG. 6 shows that the display panel 100 is a vertically aligned liquid crystal display panel, and the pixel electrode 18 may be in a shape of "*". The pixel electrode 18 may have eight-domains or sixteen-domains structure.

In some embodiments, the shape of the first electrode 161 is engaged with that of the second electrode 162 in each sub-pixel 101.

In an embodiment, the shape of the first electrode 161 is engaged with that of the second electrode 162 in each sub-pixel 101, that is, the shapes of the first electrode 161 and the second electrode 162 are fitted, matched, or symmetrical to each other in each sub-pixel 101.

In an embodiment, the shape of the first electrode 161 is engaged with that of the second electrode 162 in each sub-pixel 101, so that an electric field generated by the first electrode 161 in a frame may have a horizontal component in opposite direction with that of the second electrode 162 in the same frame, so that the two horizontal components of the electric fields may be better offset, or offset more evenly at respective parts of the sub-pixel 101.

Detailed description will be provided with reference to FIG. 7.

In some embodiments, the first electrode 161 includes two first sub-electrodes 16101 symmetrically disposed at both sides of the second electrode 162.

In some embodiments, as shown in FIG. 7, each of the first electrode 161 and the second electrode 162 has a centrosymmetric shape.

Detailed description will be provided with reference to FIGS. 8 and 9.

In some embodiments, as shown in FIGS. 8 and 9, the first electrode 161 includes a first stem electrode 1611 and at least one first branch electrode 1612, the second electrode 162 includes a second stem electrode 1621 and at least one second branch electrode 1622, the first stem electrode 1611 and the second stem electrode 1621 are disposed facing each other and in parallel, and at least a portion of the first branch electrode 1612 and at least a portion of the second branch electrode 1622 are disposed to be staggered with each other.

In some embodiments, as shown in FIGS. 8 and 9, the shape of the first stem electrode 1612 is engaged with the shape of the second stem electrode 1622.

Detailed description will be provided with reference to FIGS. 10 and 11.

In some embodiments, as shown in FIGS. 10 and 11, after the first electrode 161 is rotated by 180 degrees, the first electrode 161 has the same shape and same orientation as the second electrode 162.

In some embodiments, as shown in FIGS. 10 and 11, the first electrode 161 includes a first sub-portion 1613 extending in a first direction X and a second sub-portion 1614 connected to the first sub-portion 1613. The second electrode 162 includes a third sub-portion 1623 extending in the first direction X and a fourth sub-portion 1624 connected to the third sub-portion 1623. Each of the second sub-portion 1614 and the fourth sub-portion 1624 is located between the first sub-portion 1613 and the third sub-portion 1623. The second sub-portion 1614 and the fourth sub-portion 1624 have at least one of a triangular shape, a circular shape, a trapezoidal shape, or a rectangular shape.

In FIGS. 7 to 11, shapes of the first electrode 161 and the second electrode 162 are illustrated. So long as an electric field generated by the first electrode 161 in a frame may have a horizontal component in opposite direction with that of the first electrode 161 in another frame adjacent with the frame and thus these two horizontal components may be offset (i.e., the sum of the horizontal electric field component is zero), or offset evenly occurs at respective portions of the sub-pixel 101, the first electrode 161 and the second electrode 162 may have one of various shapes.

Embodiment 3

Figure 12:
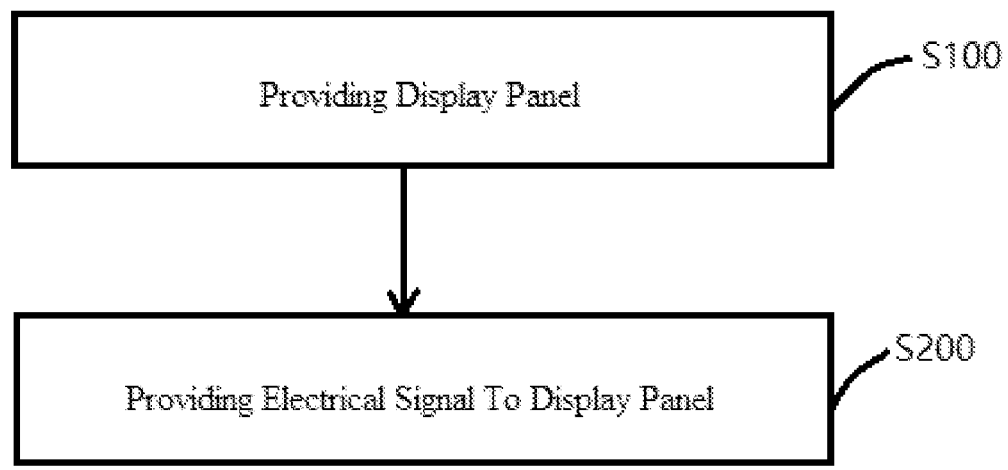
FIG. 12 is a schematic flowchart of a method of driving a display panel according to an embodiment of the present application.

FIG. 12 is a schematic flowchart of a method of driving a display panel according to an embodiment of the present application.

The present embodiment provides a method of driving the display panel 100 according to any one of the above-described embodiments. The display panel 100 according to any one of the above-described embodiments may be driven by the method of driving the display panel according to an embodiment of the present application, and has a beneficial effect in the above-described embodiments.

The present embodiment provides a method of driving a display panel. The method includes: S100, providing a display panel 100 including a plurality of sub-pixels 101, the display panel 100 including a substrate 11, a data wire 14 disposed on the substrate 11, a shield electrode 16 disposed on a side of the data wire 14 away from the substrate 11, and a plurality of pixel electrodes 18 disposed on a side of the shield electrode 16 away from the data wire 14 and disposed corresponding to the plurality of sub-pixels 101; S200, supplying an electrical signal to the display panel 100, and the voltage of the first electrode 161 is different from the second electrode 162. The shield electrode 16 corresponding to one of sub-pixel 101 includes a first electrode 161 and a second electrode 162 that are independent of each other.

In some embodiments, the difference in the voltages of the first electrode 161 and the second electrode 162 includes that the voltages of the first electrode 161 and the second electrode 162 have opposite polarities. Alternatively, the display panel 100 further includes a substrate 21 opposite to the substrate 11, and a common electrode 22 disposed on the substrate 21. The data wire 14, the shield electrode 16, the common electrode 22, and the plurality of pixel electrodes 18 are all disposed between the substrate 11 and the substrate 21. The polarity of the voltage of the first electrode 161 relative to the common electrode 22 is opposite to the polarity of the voltage of the second electrode 162 relative to the common electrode 22.

In some embodiments, the difference in the voltages of the first electrode 161 and the second electrode 162 includes that the polarity of the first electrode 161 is reversed and the polarity of the second electrode 162 is reversed in two adjacent frames of pictures. That is, when switching to the next frame, the polarity of the first electrode 161 is reversed, and the polarity of the second electrode 162 is reversed.

The method of driving the display panel according to an embodiment has the same features and advantageous effects as described in the above-mentioned embodiments, and details are not described herein.

The present application has been described in detail with reference to a method for driving a display panel and a display panel according to an embodiment of the present application. The principles and embodiments of the present application are described herein using specific examples. The description of the above embodiments is merely provided to help understand the method of the present application and its core idea. Meanwhile, variations will occur to those skilled in the art in both the detailed description and the scope of application in accordance with the teachings of the present application. In view of the foregoing, the presented description should not be construed as limiting the application.

What is claimed is:

1. A display panel comprising a plurality of sub-pixels, wherein the display panel comprises:
a first substrate;
a data wire disposed on the first substrate;
one or more shield electrodes disposed on a side of the data wire away from the first substrate;
a plurality of pixel electrodes disposed on a side of the shield electrodes away from the data wire,
wherein the plurality of pixel electrodes are disposed corresponding to the plurality of sub-pixels, respectively, and
wherein for each of the sub-pixels, the shield electrode corresponding to the sub-pixel comprises a first electrode and a second electrode that are independent of each other and the whole of the first electrode and the whole of the second electrode both are overlapped with the sub-pixel.

2. The display panel of claim 1, wherein the first electrode corresponding to each of the sub-pixels is electrically connected the first electrode corresponding to another of the sub-pixels, and the second electrode corresponding to each of the sub-pixels is electrically connected the second electrode corresponding to another of the sub-pixels.

3. The display panel of claim 2, further comprising:
a first sub-T-side common electrode disposed on the first substrate, wherein the first electrode corresponding to each of the sub-pixels is electrically connected to the first sub-T-side common electrode;
a second sub-T-side common electrode disposed on the first substrate, wherein the second electrode corresponding to each of the sub-pixels is electrically connected to the second sub-T-side common electrode.

4. The display panel of claim 1, wherein within one sub-pixel of the sub-pixels, the difference between an area of the first electrode and an area of the second electrode is less than or equal to 10% of the area of the first electrode.

5. The display panel of claim 4, wherein within one of the sub-pixels, the area of the first electrode is equal to the area of the second electrode.

6. The display panel of claim 4, wherein a shape of the first electrode is engaged with that of the second electrode corresponding to each of the sub-pixels.

7. The display panel of claim 6, wherein the first electrode comprises two first sub-electrodes, the two first sub-electrodes are symmetrically arranged at both sides of the second electrode, and each of the first electrode and the second electrode has a centrosymmetric pattern.

8. The display panel of claim 6, wherein the first electrode comprises a first stem electrode and at least one first branch electrode, the second electrode comprises a second stem electrode and at least one second branch electrode, and
wherein the first stem electrode and the second stem electrode are arranged facing with each other, at least a portion of the first branch electrode and at least a portion of the second branch electrode are staggered, and a shape of the first branch electrode is engaged with that of the second branch electrode.

9. The display panel of claim 6, wherein after the first electrode is rotated by 180 degrees, the first electrode has the same shape and same orientation as the second electrode,
the first electrode comprises a first sub-portion extending in a first direction and a second sub-portion connected to the first sub-portion,
the second electrode comprises a third sub-portion extending in the first direction and a fourth sub-portion connected to the third sub-portion,
each of the second sub-portion and the fourth sub-portion is located between the first sub-portion and the third sub-portion, and
each of the second sub-portion and the fourth sub-portion at least have one of a triangular shape, a circular shape, a trapezoidal shape, and a rectangular shape.

10. A method of driving a display panel, comprising:
providing a display panel, wherein the display panel comprises a plurality of sub-pixels, the display panel comprises a first substrate, a data wire, one or more shield electrodes, and a plurality of pixel electrodes, the data wire is disposed on the first substrate, the shield electrodes are disposed on a side of the data wire away from the first substrate, the plurality of pixel electrodes are disposed on at side of the shield electrode away from the data wire, and the plurality of pixel electrodes are disposed corresponding to the plurality of sub-pixels, and wherein for each of the sub-pixels, the shield electrode corresponding to the sub-pixel comprises a first electrode and a second electrode that are independent of each other and the whole of the first electrode and the whole of the second electrode both are overlapped with the sub-pixel; and
providing an electrical signal to the display panel, wherein voltage of the first electrode is different from voltage of the second electrode.

11. The method of claim 10, wherein the difference in the voltages of the first electrode and the second electrode comprises that the voltages of the first electrode and the second electrode have opposite polarities.

12. The method of claim 10, wherein the display panel further comprises a second substrate opposite to the first substrate, and a common electrode disposed on the second substrate,
wherein the data wire, the shield electrode, the common electrode, and a plurality of the pixel electrodes are all located between the first substrate and the second substrate, and
the difference in the voltages of the first electrode and the second electrode comprises that the polarity of the voltage of the first electrode relative to the common electrode is opposite to the polarity of the voltage of the second electrode relative to the common electrode.

13. The method of claim 12, wherein a first absolute value of a voltage difference between the voltages of the first electrode and the common electrode and a second absolute value of a voltage difference between the voltage of the second electrode and the common electrode are both less than 10 V.

14. The method of claim 12, wherein a voltage of the common electrode has a fixed value, and the voltages of the first electrode and the voltage of the second electrode are varied.

15. The method of claim 14, wherein the polarity of the first electrode and the polarity of the second electrode are unchanged during each frame of picture.

16. The method of claim 12, wherein a voltage of the common electrode is a first sub-common voltage in a first frame of any two adjacent frame and is a second sub-common voltage in another frame of the any two adjacent frame adjacent with the first frame, and each of the voltage of the first electrode and the voltage of the second electrode is switched between two fixed values.

17. The method of claim 10, wherein the difference in the voltages of the first electrode and the second electrode comprises that:
   in the two adjacent frames, the polarity of the first electrode is reversed, and the polarity of the second electrode is reversed.

\* \* \* \* \*